Nov. 8, 1938.   W. K. HOWE   2,135,514
TRAIN CONTROL SYSTEM FOR RAILROADS
Filed Nov. 30, 1932   2 Sheets-Sheet 1

INVENTOR
W. K. Howe,
BY Neil H. Preston,
ATTORNEY

Nov. 8, 1938.  W. K. HOWE  2,135,514
TRAIN CONTROL SYSTEM FOR RAILROADS
Filed Nov. 30, 1932  2 Sheets-Sheet 2

INVENTOR
W. K. Howe,
BY Neil D. Preston,
his ATTORNEY

Patented Nov. 8, 1938

2,135,514

UNITED STATES PATENT OFFICE 2,135,514

TRAIN CONTROL SYSTEM FOR RAILROADS

Winthrop K. Howe, Rochester, N. Y., assignor to General Railway Signal Company, Rochester, N. Y.

Application November 30, 1932, Serial No. 645,013

24 Claims. (Cl. 246—34)

This invention relates in general to train control systems for railways, and has more particular reference to cases where cars do not operate in metallic contact, or otherwise in electrically conducting manner, with the running rails, or treads, as is common in the ordinary steam railroad.

In the usual steam railroad operation, the car wheels and axles are electrically conducting, and are in contact with electrically conducting track rails, whereby the presence of a car in a block manifests itself by the usual wheel and axle shunt causing a track relay to operate.

In cases, however, where there is no such metallic or electrical contact connection between the car and the running rails, it is desirable to provide means for manifesting occupancy.

The condition just considered may arise in connection with rubber tired vehicles operated on usual steel rails, the vehicles being propelled by steam, gasoline motors, or gas electric means or otherwise. Also the problem arises in connection with cars with either conducting or non-conducting wheels, running on non-conducting rails or treads constructed of concrete, rubber or the like.

In short, in all cases where the usual metallic or electrical connection between the running rails and a car is not present, this problem arises.

It is proposed, in accordance with the present invention, and in connection with cases where metallic connection between a car and its running rails is not present, to provide means for indicating occupancy and controlling signals and the like.

More specifically it is proposed, to provide where there are not conducting rails, additional contact rails or wires along the trackway, and where there are conducting rails, to use the same, with which cooperates a shunt carried by the car to thereby indicate occupancy. In such case, however, it is apparent that the shunt attained cannot be as dependable as the usual track shunt due to the entire weight of a car pressing its wheels against a conducting rail, and hence it is proposed to provide means for checking the integrity and sufficiency of the shunt, and for, as far as possible, maintaining resistance of the shunt low enough to operate effectively as a track shunt. In the case of a rubber tired vehicle, running on usual steel rails, there is no occasion to supply additional contact rails, but the shunt provided can operate in connection with such usual conductive track rails.

Further objects, purposes and characteristic features of the present invention will appear as the description progresses, reference being made to the accompanying drawings showing, solely by way of example, and in a wholly diagrammatic manner, and in no manner in a limiting sense, several forms which the invention can assume. In the drawings:—

Figure 1:
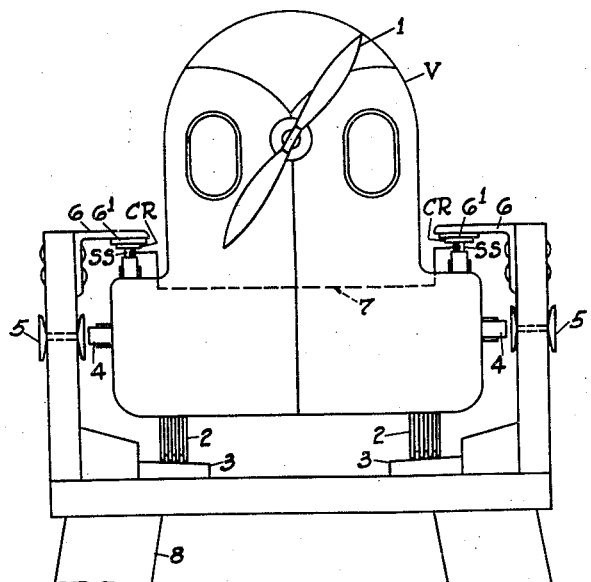
Fig. 1 is a diagrammatic elevational view of one situation wherein the invention can be used to advantage.

Referring now to the drawings, and first to Fig. 1, there is here shown one situation in which applicant's invention can be employed to advantage. A vehicle V is shown having a propeller 1 for moving the vehicle by turning of the propeller in the air. The vehicle is shown as having rubber tired wheels 2, running on treads 3, which can be formed of concrete, rubber, steel, or the like, the vehicle having rollers or the like 4, for contacting with stops 5 to limit side-sway.

Shown as carried by angle irons 6, are contact rails CR, made of electrically conducting material such as copper, steel or the like, and insulated from the angles 6 by any suitable means, such as a wood spacer $6^1$, in running contact with which rails CR are shunt shoes SS, interconnected by a very low resistance conductor 7, whereby to furnish a shunting means connected between the two contact rails CR.

The structure shown in Fig. 1 can include supporting legs 8, which may be of considerable height to furnish an elevated structure whereby to avoid grade crossings and permit of a practically gradeless trackway for the vehicle.

While one particular form of vehicle and trackway has been shown in Fig. 1, it is of course clearly to be understood that any other form, such as referred to above, and wherein the vehicle is out of electrical contact with the running rails or treads, is equally adapted to utilize applicant's invention to advantage.

Figure 2:
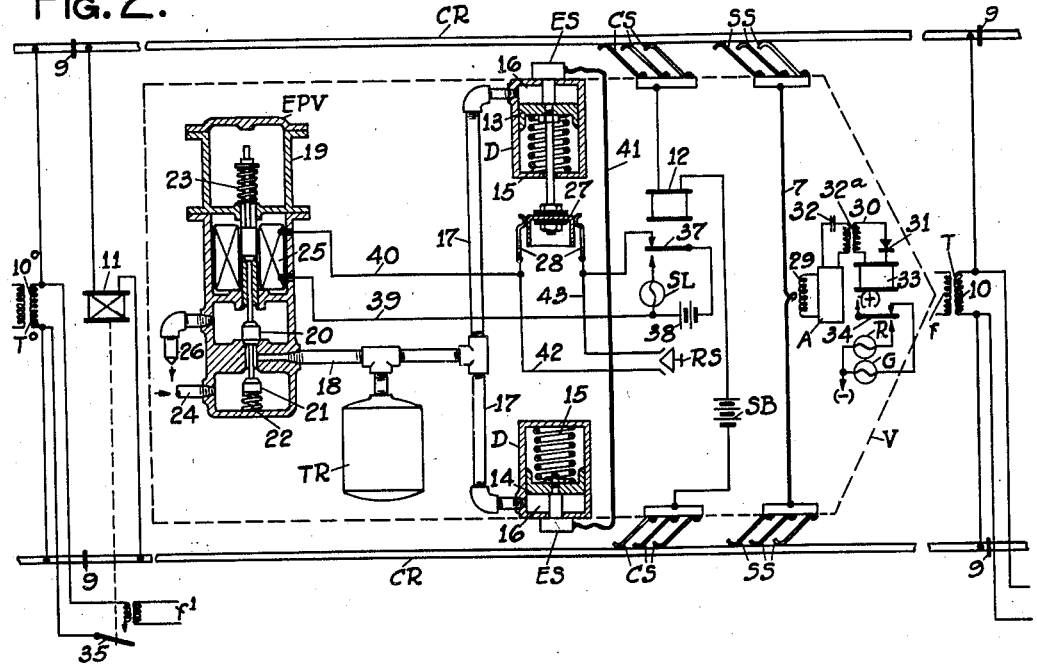
Fig. 2 is a diagrammatic view of one form of the invention.

Referring now to Fig. 2, there is here shown in a very diagrammatic manner, one form of the invention. The contact rails CR are separated into insulated blocks by insulating joints or the like 9, with a source of track circuit energy connected across the exit end of each block, and in the case shown constituted by a source $f$ of alternating current applied by a transformer T, having its secondary 10 connected across the exit end of the section. Across the entrance end of the section is a relay 11, in this particular case an alternating current relay, non-responsive to direct current, and of any desired form such as a vane relay, or motor type relay, etc., although, as will appear below, the invention is in no way limited to alternating current track circuits, and if desired, this relay 11 can have means, as a condenser, to tune it for the frequency of the source $f$.

Connected across the exit end of each block, is a source of train control alternating current $f^1$, of frequency $f^1$, (different from the frequency of source $f$) which is controlled by a contact finger 35 of the track relay 11 of the block in advance, to either connect this train control source $f^1$ across the rails, or disconnect it therefrom, dependent upon traffic conditions in advance.

Carried by the vehicle, in addition to the shunt shoes SS, is a pair of check shoes CS, connected together to include in the connection a battery SB, which may be a storage battery or may be any other desired source of direct current, and a relay 12 which, in this case, is a direct current relay and is not responsive to alternating current.

The vehicle also carries a pair of emergency shunt shoes ES, which are mounted to be operated by pistons 13 and 14, contained in housings D. These pistons are biased to a position to apply the emergency shoes to the contact rails, by means of springs or the like 15, but are normally held, as shown, out of contact with the contact rails CR, by fluid pressure such as compressed air, in chambers 16 which chambers are connected, by pipes 17 and 18 to a valve EPV. The valve EPV includes a housing 19 and valve members 20 and 21 therein, normally biased, as by spring means 22 and 23, to disconnect pipe 18 from a source 24 of fluid pressure, such as compressed air and connect it to atmosphere at 26. A winding 25, is provided, which when de-energized allows these springs 22 and 23 to move the valve members 20 and 21 so as to cut off the supply of fluid pressure to the pipe 18, and to vent the pipe 18 through exhaust pipe 26, whereby to release the fluid pressure in the chambers 16, and allow springs 15 to apply the emergency shoes ES to the contact rails CR.

This valve EPV can be of the construction such as shown in the Bushnell Patent 1,649,444 granted November 15, 1927.

Connected to pipe 18, is a timing reservoir TR, which has sufficient capacity to retain pressure in the chambers 16, and prevent the emergency shoes from being applied, for a predetermined short time after EPV has been de-energized, for a purpose which will appear later.

One of the emergency shoes ES, carries a movable contact 27, which cooperates with fixed contacts 28, to thus complete the energizing circuit for EPV when the shoes are inactive, whereby, when the emergency shoes are applied to the contact rails, contact 27 leaves contacts 28, to thus open the EPV energizing circuit.

Carried by the car, is a winding 29, which is in inductive relation to the low resistance connector 7, to cause any alternating current energy passing through the conductor 7 to induce alternating current in 29 and supply it to an amplifier A, of any usual or desired form, the output side of which amplifier is connected, through a circuit 30 having, for example, a capacity 32 therein, to tune the circuit to resonance at the frequency $f^1$, to the primary of a transformer 32$^a$, the secondary of which is connected, through a rectifier 31, to energize a signal relay or the like 33 which, through its contact 34, energizes a proceed signal G, through a front point, and a stop signal R, through a back point, as is obvious from the drawings.

It may be best now to consider the operation of the system as shown in Fig. 1.

Under normal operating conditions the track circuit energy $f$ supplied through the transformer T energizes the alternating current relay 11 to cause it to pick up its contact finger 35 and thus to connect the signal control current $f^1$ across the contact rails of the block to the rear.

In an occupied block, as the block shown in full in Fig. 2 as occupied by the vehicle V, indicated by dashed outlines, the track circuit energy (and also energy $f^1$ if any) is shunted away from the track relay 11 by means of the shunt shoes SS which affords a very low resistance and impedance path between the contact rails. Thus relay 11 is de-energized and signal control energy $f^1$ is removed from the block to the rear.

In these circumstances, the car-carried signal relay 33 of a vehicle in such rear block is de-energized and a stop signal R, through contact finger 34 and back point, is given in the cab of the vehicle in said block in the rear to indicate that the next block in advance is an occupied block.

In the case of vehicle V, as shown, the block next in advance, is assumed to be unoccupied, so that train control energy $f^1$, holds relay 33 up, to give a clear signal G, through contact finger 34 and front point, as shown in Fig. 2.

With the shunt afforded by the shunt shoe SS, of low enough resistance to operate effectively as a shunt, the battery SB sends sufficient current through the circuit including the relay 12, shoe CS, rail CR, shoe SS, cable 7, shoe SS, rail CR, shoe CS, and back to the battery, to hold relay 12 up. With relay 12 energized, contact finger 37 completes the energizing circuit for the valve EPV, which circuit includes battery 38 wire 39, winding 25, wire 40, contacts 28—27—28, and contact finger 37 and front point, to thereby hold off the emergency shoes ES from the contact rail CR.

Should the shunt shoes SS momentarily leave the contact rail the circuit supplied by battery SB, as traced above, will cause sufficient direct current to flow to arc across any such gaps and thus maintain the resistance of the shunt afforded by shunt shoes SS and cable 7, sufficiently low to operate as a shunt and indicate occupancy. Thus the check shoes CS and battery SB affords a means for supplying added conductivity in the form of a direct current produced arc, in case the resistance of the shunt SS, depended upon for indicating occupancy, should tend to increase to an unsafe value.

In case, however, that the resistance of shunt SS becomes excessive, insufficient direct current will flow through the circuit including relay 12 to maintain this relay energized. In such circumstances, relay 12 releases its contact finger 37, to complete a circuit through a signal lamp SL, which circuit is obvious from the drawings, and which indicates that the usual shunt afforded by the shoes SS cannot be depended upon.

Dropping of contact finger 37 opens the energizing circuit for the valve EPV, to thereby connect the chambers 16 to atmosphere and cut off the supply of pressure fluid thereto, whereby after a short time, as determined by the capacity of timing reservoir TR, the springs 15 apply the emergency shoes ES to contact rails CR. These shoes ES are connected together by a very low resistance and inductance cable or bus bar 41, to thereby maintain an effective shunt and indicate occupancy. The timing reservoir is provided in order to prevent unnecessary application of the emergency shoes upon a merely temporary or momentary undue increase of resistance of the shunt SS.

After the emergency shoes ES have been applied, it is necessary, in order to re-energize EPV, to operate a reset button RS, which connects wires 42 and 43 together, to shunt around the contacts 27—28, relay 12 having meanwhile picked up, (to thus de-energize SL) either due to the resistance of the shunt SS having returned to a safe and effective value, or/and if this has not taken place, due to a circuit completed between the shoes ES and CS. With EPV again energized fluid pressure withdraws the emergency shoes ES from the contact rails CR and restores the system to normal.

On restoring the parts to normal by the operation of RS, if the resistance of shunt SS—SS has not become safe in the meantime, due to any cause, such as contacting with a different rail portion, the relay 12 will again drop and re-apply ES—ES. The resistance of shoes SS—SS can thus be tested out at intervals by operation of RS.

The contacts 27—28 prevent emergency shoes ES from being applied and withdrawn successively in the event that the shunt SS be lost. It is clear that without these stick contacts 27—28, as soon as the emergency shoes are applied, the battery SB would send sufficient current through a circuit including shoes CS, ES, 41, ES and CS, to pick up relay 12 and re-energize EPV, regardless of whether or not the resistance of the shunt SS—SS had meanwhile returned to a safe value.

Thus, in the form shown in Fig. 2, shoes SS and connecting cable 7, are normally depended upon for shunting the contact rails CR and indicating occupancy. If the resistance of this shunt becomes excessive due for example to the shoes SS leaving the contact rails, due to vibration or the like, a direct current arc is drawn between the shoes and rails to thus normally maintain the resistance low enough to constitute a good shunt.

In the case however that the resistance of shunt SS—SS becomes too great nevertheless, the emergency shoes ES are automatically applied to thereby insure a good shunt, and a signal SL, is given, until shoes ES are applied, to indicate to the engineer that normal conditions do not exist. The engineer can then operate his reset button RS, and if the signal SL, after becoming de-energized, remains de-energized, he is assured that normal conditions have reasserted themselves.

If desired, signal SL can continuously indicate until the reset button RS is operated, by operating it through a stick relay, picked up upon release of 12, and dropped on closure of an auxiliary contact on RS, as is obvious to one skilled in the art.

In case, however, that the resistance of the shunt SS has not returned to a safe value, as soon as the emergency shoes ES are withdrawn from the contact rails CR, valve EP will be again de-energized, and the signal SL will be again displayed, whereby the engineer can from time to time test whether normal operating conditions have returned, after having received a warning from the signal SL.

Referring now to the form of invention shown in Fig. 3, this form is somewhat different from that just described, and only the essential differences between the two forms will be considered in any detail whatsoever in the following description.

A battery ISB is connected across a portion 45 of the wire 44 interconnecting the check shoes ICS, this section 45 of wire being sufficient to produce enough voltage drop to send sufficient current through the circuit including the shoes ICS and ISS to produce a voltage drop in wire section 46 sufficient to energize relay $12^1$ under normal conditions of resistance of the shunt afforded by the shunt shoes ISS—ISS.

Should the resistance of the shunt ISS become excessive, i. e., if not cared for by direct current arcing across gaps, as described above, the relay $12^1$ will release its contact finger $37^1$ to apply the emergency shoes IES in the same general manner as described above. Application of the emergency shoes, in this form, does not allow a pick-up current to flow through the relay $12^1$, since the relay $12^1$ and battery ISB are not in series with each other between the contact rails ICR. Thus there is no need, in this form, for the signal SL and the stick contacts 27—28 and reset button RS, of the form shown in Fig. 2.

Only after the resistance of the shunt afforded by shoes ISS—ISS, returns to within safe limits, will there be sufficient voltage drop across the relay $12^1$, to pick it up and re-energize IEPV to thereby withdraw the emergency shoes IES from the contact rails.

In this form of the invention, the car-carried signalling circuit has not been shown, but can be of the same form as shown in Fig. 2, and receives its energy from windings $29^0$ and $29^1$, which are positioned to be in inductive relationship to the contact rails ICR. Also, the signalling current can be applied to the contact rails as in Fig. 2, if desired.

Included in the energizing circuit for valve IEPV is a so-called dead man's button, DMB, which is a contactor biased to open position by a spring or the like 47, and must be held closed by the engineer to prevent application of the emergency shoes IES, whereby, in the event that the engineer should become incapacitated, the emergency shoes IES are applied, to give added safeguard against any failure due to loss of shunt and absence of the vigilance of the engineer.

Furthermore when the vehicle is proceeding at a fast speed, there is of course less danger of an approaching car running into it, and causing damage, than if proceeding more slowly, whereas, the slower the vehicle is proceeding, the greater is the danger from the rear or, in other words, the greater is the necessity for occupancy being indicated by the shunt. Accordingly, to care for this situation, a contact 48 is included in series in the energizing circuit for the valve IEPV, and this contact is controlled by a cam or the like 49, as for example in Patent No. 1,700,695 granted June 29, 1929, to C. S. Bushnell, to allow the contact to open at any speed below a specified value such, for example, as 10 miles per hour. Thus, at low speeds, the added safeguard of the application of the emergency shoes IES, is provided, in a wholly automatic manner.

In connection with the two forms of invention just described, a two-position cab signal has been disclosed, but it is obvious that a three, or more position signal can be readily provided, as for example, by employing a second signalling frequency in addition to the frequency $f^1$, which would be applied through a back point of the track relay 11, or in any other usual or desired manner.

In the forms of invention just described, alternating current track circuits have been employed, with track relays responsive only to alternating current, and with car relays 12 responsive only to direct current, thereby to prevent the direct current carried by the car from picking up the track relay to the rear of the car, and to prevent the alternating current track circuit energy from maintaining the car relay 12 energized, even though the resistance of the shunt SS and 1SS be excessive.

It is contemplated that just the converse of this arrangement of parts can be employed. That is, a direct current track circuit with direct current energy, and direct current relay, together with an alternating current car-carried relay and an alternating current source of energy on the car for operating such relay.

Furthermore, the invention is not limited to the arrangement described above, as it is clear that direct current, for example, can be employed throughout, both on the track and on the car. Such arrangement is shown in a very diagrammatic manner in Fig. 4 wherein there are shunt shoes 2SS, and check shoes 2CS and emergency shoes 2ES with a relay 12² and battery 2SB. In this form the track circuit energy as supplied by battery 2TB normally energizes a track relay 2TR of the direct current type, and the car relay 12² is also of the direct current type.

In this form of invention, should the resistance of the shunt 2SS—2SS become excessive, insufficient current from battery 2SB is supplied to relay 12² to maintain it energized, and thereby causes 12² to drop so that emergency shoes 2ES are applied in an automatic manner, in the same manner as described above with regard either to Fig. 2 or 3.

Figure 4:
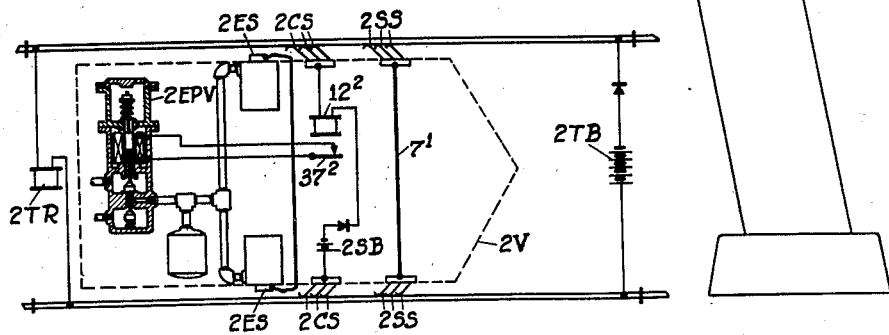
Fig. 4 is a diagrammatic fragmentary view of another modified form of the invention.

In the form shown in Fig. 4 the battery 2SB is of such a voltage that it is normally sufficient to pick up and hold up its relay 12², but is insufficient to pick up the track relay 2TR to the rear of a vehicle occupying a block.

Further, the track battery 2TB is of such a voltage as to operate the track relay 2TR, but to be ineffective to operate the car-carried relay 12². These various marginal operating characteristics can be obtained by varying the battery voltages employed and the resistances and number of turns of the windings of the relays involved.

Furthermore, in addition to adjusting the voltages of the batteries and the windings of the relays involved, the battery 2SB can be poled in the direction as indicated by the arrow, with relation to the poling of the track battery 2TB.

With the arrangement shown in Fig. 4, and with the shunt shoes 2SS affording a good shunt, both of the batteries 2TB and 2SB are shunted away from the track relay by the shunt 2SS. Also, battery 2TB is shunted away from the car relay 12², but this same shunt allows car battery 2SB to maintain the car relay 12² in energized condition.

Should the shunt 2SS be lost, there is a momentary tendency for both of the batteries to pick up the track relay 2TR. With the shunt 2SS lost, however, not only is battery 2SB unable to supply sufficient current to the car relay to hold it up, but track battery 2TB bucks the car battery, whereby to additionally insure that the car relay 12² shall become de-energized upon a loss of shunt by 2SS.

Figure 3:
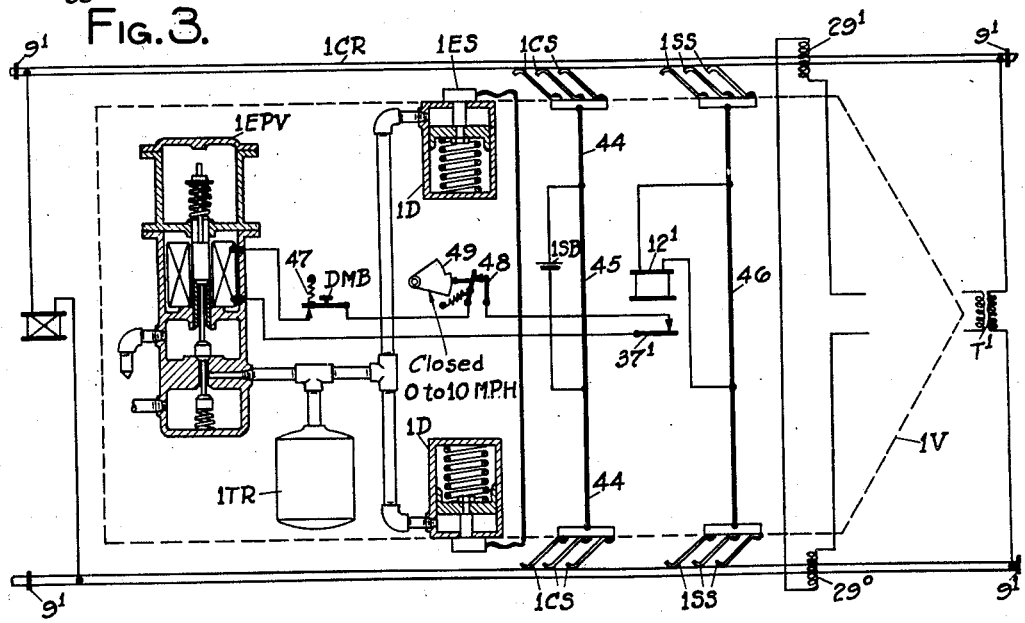
Fig. 3 is a diagrammatic fragmentary view of a modified form of the invention.

Upon relay 12² releasing its contact finger, the emergency shoes 2ES are applied, to thereby restore normal occupancy conditions, that is, to drop track relay 2TR and pick up car relay 12², in case the control be as shown in Fig. 2, or, in case the control be as shown in Fig. 3, (it being understood that Fig. 4 can be modified to have the car battery and car relay connected as shown in Fig. 3, instead of as now shown in Fig. 4) the car relay 12² picks up only after the resistance of shunt 2SS has returned to a safe value.

In describing several forms of this invention, as set forth above, it is not desired to limit the invention in any manner whatsoever to any particular form of vehicle or trackway, or to any particular type of track circuit or car-carried apparatus, other than may be necessary to make the invention operative as contemplated by the above disclosure.

The above rather specific description of several forms which this invention can assume, has been given solely by way of example, and is not intended, in any manner whatsoever, in a limiting sense. Obviously, the invention can assume many other physical forms, and is susceptible of numerous modifications, and all such forms and modifications are intended to be covered by this application, as come within the scope of the appended claims.

Having described my invention, I now claim:—

1. In combination with a vehicle out of electrical contact with its running rails, a track circuit, a main shunt carried by the vehicle for shunting the track circuit by conduction, an emergency shunt carried by the vehicle for at times shunting the track circuit by conduction, plungers for operating the emergency shunt, and means for causing the plungers to automatically apply the emergency shunt upon loss of the main shunt.

2. In combination with a vehicle out of electrical contact with its running rails, a track circuit, a main shunt carried by the vehicle for shunting the track circuit by conduction, an emergency shunt carried by the vehicle for at times shunting the track circuit by conduction, plungers for operating the emergency shunt, and means, including a car-carried relay, for causing the plungers to automatically apply the emergency shunt upon loss of the main shunt causing de-energization of the relay.

3. In combination with a vehicle out of electrical contact with its running rails, a track circuit, a main shunt carried by the vehicle for shunting the track circuit by conduction, an emergency shunt carried by the vehicle for at times shunting the track circuit by conduction, plungers for operating the emergency shunt, and means, including a car-carried relay, the relay being energized through a circuit including a portion of the track circuit and the main shunt and adjusted to release upon the resistance of the main shunt becoming excessive, for causing the plungers to automatically apply the emergency shunt upon loss of the main shunt causing de-energization of the relay.

4. In the case of a vehicle out of electrical contact with its running rails, a track circuit, a main shunt and an emergency shunt carried by the car each for shunting the track circuit, and withholding means normally making the emergency shunt ineffective, and including elastic means biasing the emergency shunt to its effective position, and fluid pressure opposing the elastic means.

5. In the case of a vehicle out of electrical contact with its running rails, a track circuit, a main shunt and an emergency shunt carried by the car each for shunting the track circuit, withholding means normally making the emergency shunt ineffective, and including elastic means biasing the emergency shunt to its effective position, and fluid pressure opposing the elastic means, a device controlling the fluid pressure, and an energizing circuit for the device which circuit is closed when the main shunt is operative to thus energize the device and place fluid pressure on the emergency shunt.

6. In the case of a vehicle out of electrical contact with its running rails, a track circuit, a main shunt and an emergency shunt carried by the car each for shunting the track circuit, withholding means normally making the emergency shunt ineffective and including elastic means biasing the emergency shunt to its effective position and fluid pressure opposing the elastic means, a device controlling the fluid pressure, an energizing circuit for the device closed when the main shunt is operative, to energize the device and thus place fluid pressure on the emergency shunt, and means for opening the circuit for said device, upon loss of the main shunt, to thus exhaust fluid pressure from the emergency shunt.

7. In the case of a vehicle out of electrical contact with its running rails, a track circuit, a main shunt and an emergency shunt carried by the car each for shunting the track circuit, withholding means normally making the emergency shunt ineffective, and including elastic means biasing the emergency shunt to its effective position and fluid pressure opposing the elastic means, a device for controlling the fluid pressure, an energizing circuit for the device, closed when the main shunt is operative, to energize the device and thus place fluid pressure on the energizing shunt, means for opening the circuit for said device upon loss of the main shunt to thus exhaust fluid pressure from the energizing shunt, a contact in the energizing circuit for the device which is open when the emergency shunt is effective, and a manually operable reset for closing the circuit for said device.

8. In combination with a vehicle out of contact with its running rails, an alternating current track circuit including a track relay responsive only to alternating current, a car-carried main shunt and emergency shunt each for shunting the track circuit, means normally making the emergency shunt ineffective, and means for making the emergency shunt effective upon failure of the main shunt and including a source of direct current and a relay non-responsive to alternating current.

9. In combination with a vehicle out of contact with its running rails, an alternating current track circuit including a track relay responsive only to alternating current, a car-carried main shunt and emergency shunt each for shunting the track circuit, means normally making the emergency shunt ineffective, and means for making the emergency shunt effective upon failure of the main shunt and including, a source of direct current and a relay responsive only to direct current, the relay and direct current source being connected in series across the track circuit.

10. In combination with a vehicle out of contact with its running rails, an alternating current track circuit including a track relay responsive only to alternating current, a car-carried main shunt and emergency shunt each for shunting the track circuit, means normally making the emergency shunt ineffective, and means for making the emergency shunt effective upon failure of the main shunt and including a source of direct current and a relay responsive only to direct current, the relay and source being connected in series across the track circuit, the relay being adjusted to be held up by the direct current source only if the resistance of the main shunt be within safe limits.

11. In combination with a vehicle out of contact with its running rails, an alternating current track circuit including a track relay responsive only to alternating current, a car-carried conducting main shunt and emergency shunt each for shunting the track circuit, means normally making the emergency shunt ineffective, and means for making the emergency shunt effective upon failure of the main shunt and including, a source of direct current and a relay responsive only to direct current, the direct current source being connected to energize the direct current relay through a circuit including the main shunt and designed to draw an arc between the main shunt contactors and track circuit, if the main shunt breaks contact with the track circuit, whereby to maintain the resistance of the main shunt at a low value.

12. In combination with a vehicle out of contact with its running rails, an alternating current track circuit including a track relay responsive only to alternating current, a car-carried main shunt and emergency shunt each for shunting the track circuit, means normally making the emergency shunt ineffective, and means for making the emergency shunt effective upon failure of the main shunt and including a source of direct current and a relay responsive only to direct current, the direct current source being connected to energize the direct current relay through a circuit including the main shunt and designed to draw an arc between the main shunt contactors and track circuit, if the main shunt breaks contact with the track circuit, whereby to maintain the resistance of the main shunt at a low value, and means to make the emergency shunt effective upon release of the direct current relay.

13. In combination with a vehicle and a track circuit, a main shunt and an emergency shunt carried by the vehicle, a relay on the vehicle non-responsive to track circuit energy, vehicle carried energy connected to energize the relay through a circuit including the main shunt and parts of the track circuit so long as the resistance of the main shunt is not excessive, and means to make the emergency shunt effective upon release of the relay.

14. In combination with a vehicle and track circuit, a main shunt and an emergency shunt, both conductive, carried by the vehicle, the emergency shunt being normally ineffective, a relay on the vehicle non-responsive to track circuit energy, vehicle carried direct current energy connected to energize the relay through a circuit including the main shunt and part of the track circuit so long as the resistance of the main shunt is not excessive, whereby to draw a direct current arc if the main shunt moves out of contact with the track circuit, and means to make the emergency shunt effective upon release of the relay.

15. In combination with a vehicle out of electrical contact with its supporting rails, and a track circuit, a car-carried main conducting shunt, a car-carried conducting emergency shunt normally ineffective, a car-carried check shunt, a relay connected across the main shunt, a source of energy connected across the check shunt, and means controlled by the relay for making the emergency shunt effective.

16. In combination with a vehicle out of electrical contact with its supporting rails, and a track circuit, a car-carried conducting main shunt, a car-carried conducting emergency shunt normally ineffective, a car-carried check shunt, a relay connected across the main shunt, a source of energy connected across the check shunt and designed to energize the relay while the main shunt is effective, and means controlled by the relay for making the emergency shunt effective upon release of the relay.

17. In combination with a vehicle out of electrical contact with its supporting rails, and a track circuit, a car-carried main conducting shunt, a car-carried conducting emergency shunt normally ineffective, a car-carried check shunt, a relay connected across the main shunt, a source of energy connected across the check shunt and designed to energize the relay while the main shunt is effective, and means having an energizing circuit including a contact of said relay and a low speed contact, said means making the emergency shunt effective upon release of the relay due to a defective main shunt.

18. In combination with a vehicle out of electrical contact with its supporting rails, and a direct current track circuit associated therewith, a main shunt on the vehicle and normally effective to shunt the track circuit, an emergency shunt on the vehicle and normally ineffective to shunt the track circuit, and means, including a vehicle carried direct current relay and source of direct current connected to normally energize the relay through a circuit including the main shunt, for making the emergency shunt effective upon failure of the main shunt.

19. In combination with a vehicle out of electrical contact with its supporting rails, and a direct current track circuit associated therewith, a main shunt on the vehicle and normally effective to shunt the track circuit, an emergency shunt on the vehicle and normally ineffective to shunt the track circuit, and means, including a vehicle carried direct current relay and source of direct current connected to normally energize the relay through a circuit including the main shunt, for making the emergency shunt effective upon failure of the main shunt, the vehicle carried source of current being poled to oppose the source of energy for the track circuit.

20. In combination with a vehicle on running rails, a track circuit, shunt means on the vehicle for shunting the track circuit by conduction, and means on the vehicle responsive to the current through said shunt means for pressing another vehicle carried shunt means against the running rails.

21. In combination with a rail vehicle and a section of railway track, a source of current on the vehicle, vehicle carried track shunting means including a rail shoe for each rail and including means for applying a potential from said source across the two rails of the track to cause a rail current to flow, another shunting means carried by the vehicle, and pressure regulating means controlled by a decrease of the rail current below a predetermined value for causing the other shunting means to be pressed against the rails.

22. In combination with a rail vehicle and a section of railway track, a source of current on the vehicle, vehicle carried track shunting means including a rail shoe for each rail and including means for applying a potential from said source across the two rails of the track to cause a rail current to flow, another shunting means carried by the vehicle, pressure regulating means controlled by a decrease of the rail current below a predetermined value for causing the other shunting means to be pressed against the rails, and means for removing pressure from the other shunting means provided the rail current is at or above said predetermined value.

23. In connection with a vehicle out of electrical contact with its running rails, a track circuit, vehicle carried shunting means shunting the track circuit, means to cause current to flow through the shunting means, another shunt means on the vehicle, operating means for pressing the other shunting means against the rails to shunt the track circuit and including, elastic means opposed by fluid pressure, a device for controlling the fluid pressure, an energizing circuit for the device, closed when the current flow through the shunting means is at or above a predetermined value, means for opening the circuit for the device upon the shunt current falling below said predetermined value, to thus permit the elastic means to allow the pressing of the other shunt means against the rails, a contact in the energizing circuit for the device which is open when the other shunt means is thus pressed, and a manually operable reset for closing the circuit for said device only if the shunt current is at or above said predetermined value.

24. In combination with a rail vehicle and a section of railway track, a first source of track circuit current and a track relay for said section, a second source of current on said vehicle of such character as to be incapable of operating said track relay, means including a vehicle-carried circuit from one to the other rail for applying a potential from said second source across the two rails of said track for breaking down the resistance film on the rail surface to aid shunting of said track relay by said vehicle-carried circuit, and an indicator on the vehicle immune to current from said second source and responsive to the magnitude of the current from said first source flowing in said circuit.

WINTHROP K. HOWE.